United States Patent
Endsley et al.

[11] Patent Number: 5,609,221
[45] Date of Patent: Mar. 11, 1997

[54] STEERING CONTROL SYSTEM

[75] Inventors: John C. Endsley, Washington; C. Nickolas Goloff, Secor; William F. Guse, Jr., Park Ridge; Joseph P. Reilly, Oak Park, all of Ill.

[73] Assignee: Caterpillar Inc., Peoria, Ill.

[21] Appl. No.: 289,738

[22] Filed: Mar. 6, 1995

[51] Int. Cl.$^6$ ........................................................ B62D 5/08
[52] U.S. Cl. ............................ 180/414; 180/403; 180/442
[58] Field of Search ....................................... 180/403, 408, 180/414, 415, 417, 442

[56] References Cited

U.S. PATENT DOCUMENTS

| | | | |
|---|---|---|---|
| 3,913,234 | 10/1975 | Miller et al. | 180/403 X |
| 4,043,422 | 8/1977 | Barrett et al. | 180/140 |
| 4,917,204 | 4/1990 | Andrew et al. | 180/140 |
| 5,111,901 | 5/1992 | Bachhuber et al. | 180/140 |

FOREIGN PATENT DOCUMENTS 2102752  2/1983  United Kingdom.

Primary Examiner—Kevin Hurley
Attorney, Agent, or Firm—J. W. Burrows

[57] ABSTRACT

Known all wheel steer arrangements use standard spool-type valves which are inherently subject to leakage that results in the front and rear wheels getting out of synchronization due to the leakage. In the subject invention, a hydraulic system has front and rear pairs of steerable wheels respectively interconnected by front and rear fluid actuated mechanisms. A steering valve delivers pressurized fluid to the front fluid actuated mechanism for steering of only the front pair of wheels and to both the front and rear fluid actuated mechanisms to steer the front and rear pairs of wheels simultaneously but in opposite directions. Furthermore, a rear steer valve mechanism is provided to independently direct pressurized fluid to the rear fluid actuated mechanism to steer the rear pair of wheels independent of the front pair of wheels. A normally open pilot operated poppet valve and a pair of normally closed pilot operated poppet valves are utilized to provide control for the various modes of operation and to provide separation of the fluid between the front and rear fluid actuated mechanisms when they are being operated independently. By utilizing pilot operated poppet valves, the leakage thereacross is substantially reduced and the synchronization between the front and rear pair of wheels is generally maintained.

10 Claims, 2 Drawing Sheets

STEERING CONTROL SYSTEM

TECHNICAL FIELD

This invention relates generally to steering of an all wheel steer machine and, more particularly to a steering control system for use on an all wheel steer machine.

BACKGROUND ART

Many systems for controlling the steering of machines have included mechanical systems in which cables and other mechanisms are arranged so that the rear wheels can be steered in conjunction with the front wheels. Today, most systems use hydraulic pumps and various hydraulic valves and other components to control the steering of the vehicle. Likewise, electronically controlled four wheel steering systems have been used in which electronic controls select the steering mode and provide for independently controlling the various steered wheels on the machine. In the systems used today, the control valves are spool type valves which, as is well known, have varying degrees of leakage between the spool and the bore in which the spool is slidably disposed. In an all wheel steer vehicle, in which the rear wheels are to be steered in conjunction with the front wheels, the leakage across a spool-type valve can result in the front and rear wheels becoming out of sync. There have been various attempts at trying to keep the front and rear steered wheels in synchronization by using various electronic controls and/or other mechanical linkage-type controls. These known types of mechanisms to control synchronization between the front and rear steered wheels results in added complexity and cost.

The present invention is directed to overcoming one or more of the problems as set forth above.

DISCLOSURE OF THE INVENTION

In one aspect of the present invention, a steering control system is provided and adapted for use on an all wheel steer machine having front and rear pairs of steerable wheels with each pair of wheels being interconnected to the machine by a fluid actuated mechanism. A source of pressurized fluid and a reservoir are provided in the system. The steering control system includes a steer controlled mechanism operative to select a plurality of steering modes including a first mode in which only the front wheels are steerable, a second mode in which the front and rear wheels are steered simultaneously but in opposite directions, and a third mode in which the rear wheels are steered independently of the front wheels. The steer control mechanism includes a steering valve having first and second outlet ports and being disposed between the source of pressurized fluid and the front and rear fluid actuated mechanisms. The first outlet port is connected directly to one end of the front fluid actuator mechanism. A normally opened pilot operated poppet valve is disposed between the second outlet port and the other end of the front fluid actuated mechanism. A first normally closed pilot operated poppet valve is disposed between one end of the rear fluid actuated mechanism and the second outlet port of the steering valve and a second normally closed pilot operated poppet valve is disposed between the other end of the rear fluid actuated mechanism and the front fluid actuated mechanism. A rear steer valve mechanism is disposed between the source of pressurized fluid and the rear fluid actuated mechanism and operative to selectively interconnect the source of pressurized fluid to the rear fluid actuated mechanism to steer the rear wheels. A sensing arrangement is connected to both ends of the rear fluid actuated mechanism and is operative to continuously sense and deliver the highest pressure signal therefrom. A signal control mechanism is provided and selectively directs the highest pressure signal from the sensing arrangement to the normally opened pilot operated poppet valve or to the pair of normally closed pilot operated poppet valves.

The present invention provides a steering control system which insures that various modes of steering can be achieved through an integral hydraulic system incorporating the use of pilot operated poppet valves. The subject invention uses poppet valves in conjunction with the steering valves to control the various modes of steering. By using poppet valves, the leakage of hydraulic fluid between the front and rear fluid actuating mechanisms is substantially overcome thus offsetting the problem of the front and rear wheels becoming out of sync during operation.

BEST MODE FOR CARRYING OUT THE INVENTION

Figure 1:
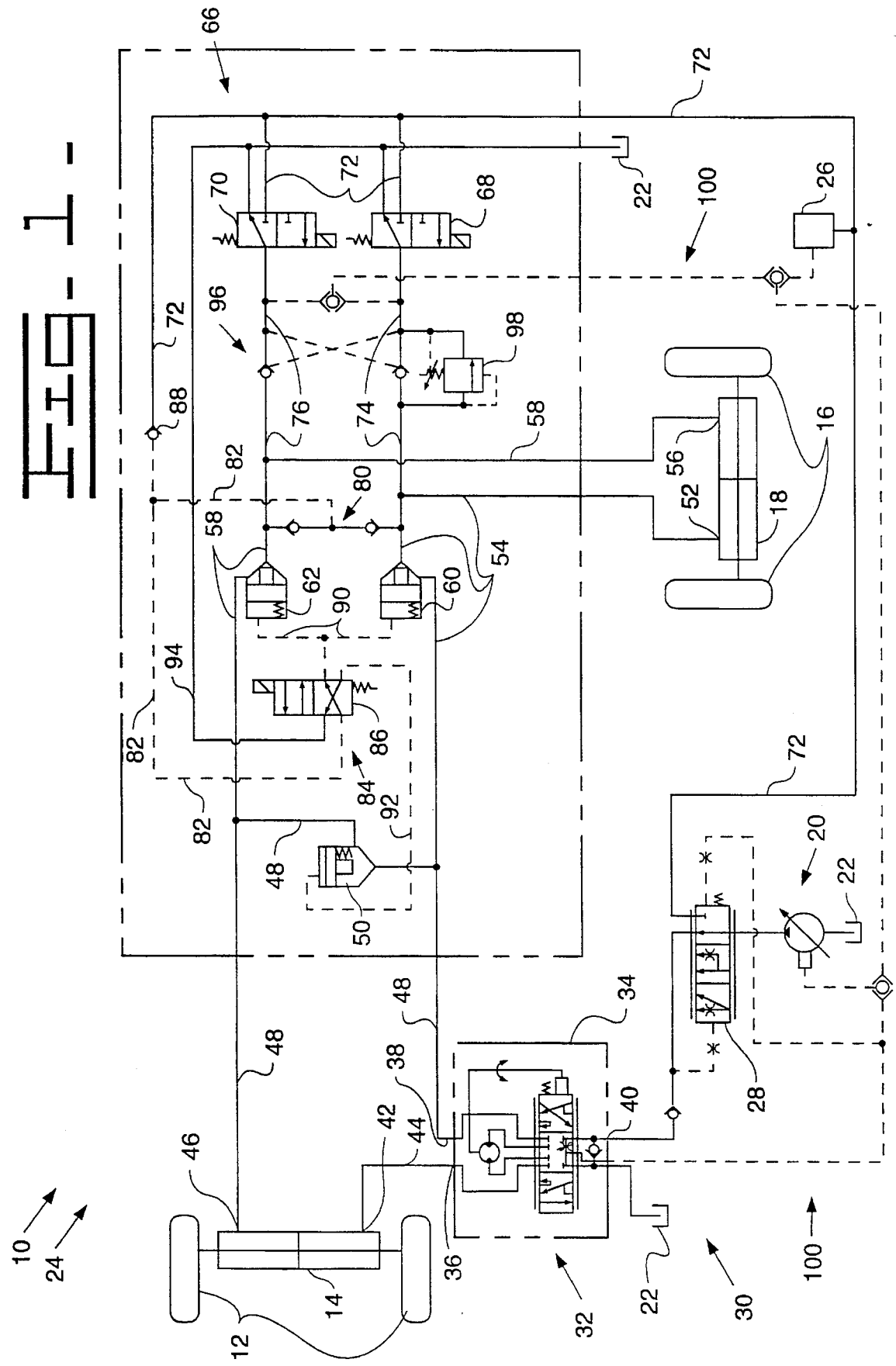
FIG. 1 is a schematic representation of a steering control system incorporating an embodiment of the present invention.

Referring to the drawings, and more specifically to FIG. 1, a hydraulic system 10 is illustrated for use on a machine (not shown) having a front pair of steerable wheels 12 interconnected by a fluid actuated mechanism 14 and a rear pair of steerable wheels 16 interconnected by a fluid actuated mechanism 18. The hydraulic system 10 includes a source of pressurized fluid 20 that receives fluid from a reservoir 22, a steering control system 24 and an implement system 26.

In the subject arrangement, the front and rear fluid actuated mechanisms 14,18 are illustrated as being a single cylinder having a rod extended from each end thereof. However, it is recognized that each of the front and rear fluid actuated mechanisms 14,18 could be two separate cylinders with their respective chambers interconnected such that they would function identically to a single double acting cylinder.

In the subject arrangement, the source of pressurized fluid 20 delivers fluid to a priority valve 28, which in a well known manner, delivers fluid on a priority basis to the steering control system 24 prior to delivering any fluid to the implement system 26. It is well known that if a priority valve 28 is not used, a flow divider valve or other types of valves could be utilized to provide fluid flow to both the steering control system 24 and the implement system 26.

The steering control system 24 includes the front and rear fluid actuated mechanisms 14,18 and a steer control mechanism 30. The steer control mechanism 30 is operative to select a plurality of steering modes including a first mode in which only the front pair of wheels 12 are steerable, a second mode in which the front and rear pairs of wheels 12,16 are steered simultaneously with the rear pair of wheels 16 steered in a direction opposite to the steering direction of the front pair of wheels 12, and a third mode in which the rear pair of wheels 16 are steered independently of the front pair of wheels 12.

The steer control mechanism 30 includes a steering valve 32 that is disposed between the source of pressurized fluid 20 downstream of the priority valve 28 and the front and rear fluid actuated mechanisms 14,18. The steering valve 32, as illustrated herein, is a hand metering unit (HMU) 34 having first and second outlet ports 36,38 and is connected to the source of pressurized fluid 20 through an inlet port 40. The first outlet port 36 of the HMU is connected directly to one end 42 of the front fluid actuated mechanism 14 by a conduit 44. The second outlet port 38 is connected to the other end 46 of the front fluid actuated mechanism 14 by a conduit 48. A normally open pilot operated poppet valve 50 is disposed in the conduit 48 between the second outlet port 38 and the other end 46 of the front fluid actuated mechanism 14.

One end 52 of the rear fluid actuated mechanism 18 is connected to the second outlet port 38 of the steering valve 32 through the conduit 54 and the conduit 48. Another end 56 of the rear fluid actuated mechanism 18 is connected to the other end 46 of the front fluid actuated mechanism 14 through a conduit 58 and a portion of the conduit 48 downstream of the normally open pilot operated poppet valve 50. A first normally closed pilot operated poppet valve 60 is disposed in the conduit 54 between the one end 52 of the rear fluid actuated mechanism 18 and the second outlet port 38 of the steering valve 32. A second normally closed pilot operated poppet valve 62 is disposed in the conduit 58 between the other end 56 of the rear fluid actuated mechanism 18 and the other end 46 of the front fluid actuated mechanism 14.

The steering control mechanism 30 also includes a rear steer valve mechanism 66 that is disposed in the system between the source of pressurized fluid 20 downstream of the priority valve 28 and the rear fluid actuated mechanism 18. The rear steer valve mechanism 66 includes first and second two-position three-way valves 68,70 each respectively connected to the source of pressurized fluid by the conduit 72. In the subject invention, the first and second two position three-way valves are electrically actuated. It is recognized that various other valves could be utilized in place of the one's illustrated without departing from the essence of the invention.

The first two-position three-way valve 68 is connected to the one end 52 of the rear fluid actuated mechanism 18 by a conduit 74 and the conduit 54 and the second two-position three-way valve 70 is connected to the other end 56 of the rear fluid actuated mechanism 18 by a conduit 76 and the conduit 58. The conduit 74 is connected to the conduit 54 at a location between the one end 52 of the rear fluid actuated mechanism 18 and the first normally closed pilot operated poppet valve 60 while the conduit 76 is connected to the conduit 58 at a location between the other end 56 of the rear fluid actuated mechanism 18 and the second normally closed pilot operated poppet valve 62.

A first sensing arrangement 80 is connected to the conduit 54 and 58 at a location between the rear fluid actuated mechanism 18 and the respective first and second normally closed pilot operated poppet valves 60,62 and is operative to deliver the highest pressure signal from the rear fluid actuated mechanism through a pilot conduit 82 to a signal control mechanism 84. The signal control mechanism 84, in the subject embodiment, is a two-position four-way valve 86 that is electrically actuated. It is recognized that various other valves could be utilized in place of the one illustrated without departing from the essence of the invention.

The source of pressurized fluid 20 in the conduit 72 is in communication with the signal control mechanism 84, in parallel with the highest pressure signal from the rear fluid actuated mechanism 18, through a one-way check valve 88 and the pilot conduit 82. The one-way check 88 and the first sensing arrangement 80 are effective to deliver the highest pressure signal from the source of pressurized fluid or from the rear fluid actuated mechanism 18 to the signal control mechanism 84.

In the first position of the two-position four-way valve 86, the pilot conduit 82 is in communication through a pilot conduit 90 with the first and second normally closed pilot operated poppet valves 60,62 to forcibly hold them in their closed positions while a pilot conduit 92 leading from the normally open pilot operated poppet valve 50 is vented to the reservoir 22 through a conduit 94. In the second position of the two-position four-way valve 86, the pilot conduit 82 is connected with the pilot conduit 92 to forcibly urge the normally open pilot operated poppet valve 50 to its closed position while the pilot conduit 90 is connected with the pilot conduit 94 to vent any pressurized fluid in the pilot conduit 90 to the reservoir 22.

A lock valve 96 is disposed in the conduits 74,76 between both ends of the rear fluid mechanism 18 and the rear steer valve mechanism 66. The lock valve 96, in a well known manner, blocks the fluid flow in the respective conduits 74,76 from the ends of the rear fluid actuated mechanism 18 back to the rear steer valve mechanism 66 when the rear steer valve mechanism 66 is not being operated.

A thermal expansion valve 98 is disposed in the conduit 74 between the one end 52 of the rear fluid actuated mechanism 18 and the first two-position three-way valve 68. The thermal expansion valve 98 is located in the line in parallel with one side of the lock valve 96 and operational to permit fluid flow around the lock valve 96 when the pressure of the fluid in the rear fluid actuated mechanism 18 exceeds a predetermined level. The thermal expansion valve 98 is a low flow, high pressure relief valve that is effective to relieve temperature induced high pressure fluid from a trapped conduit or line. The relief setting of the thermal expansion valve 98 is set at a level higher than the normal operating system pressure.

In a well known manner, a logic system 100 is illustrated and operational to sense the highest operating pressure in the hydraulic system 10 and directs the highest signal to the source of pressurized fluid 20 to control the fluid flow therefrom.

Figure 2:
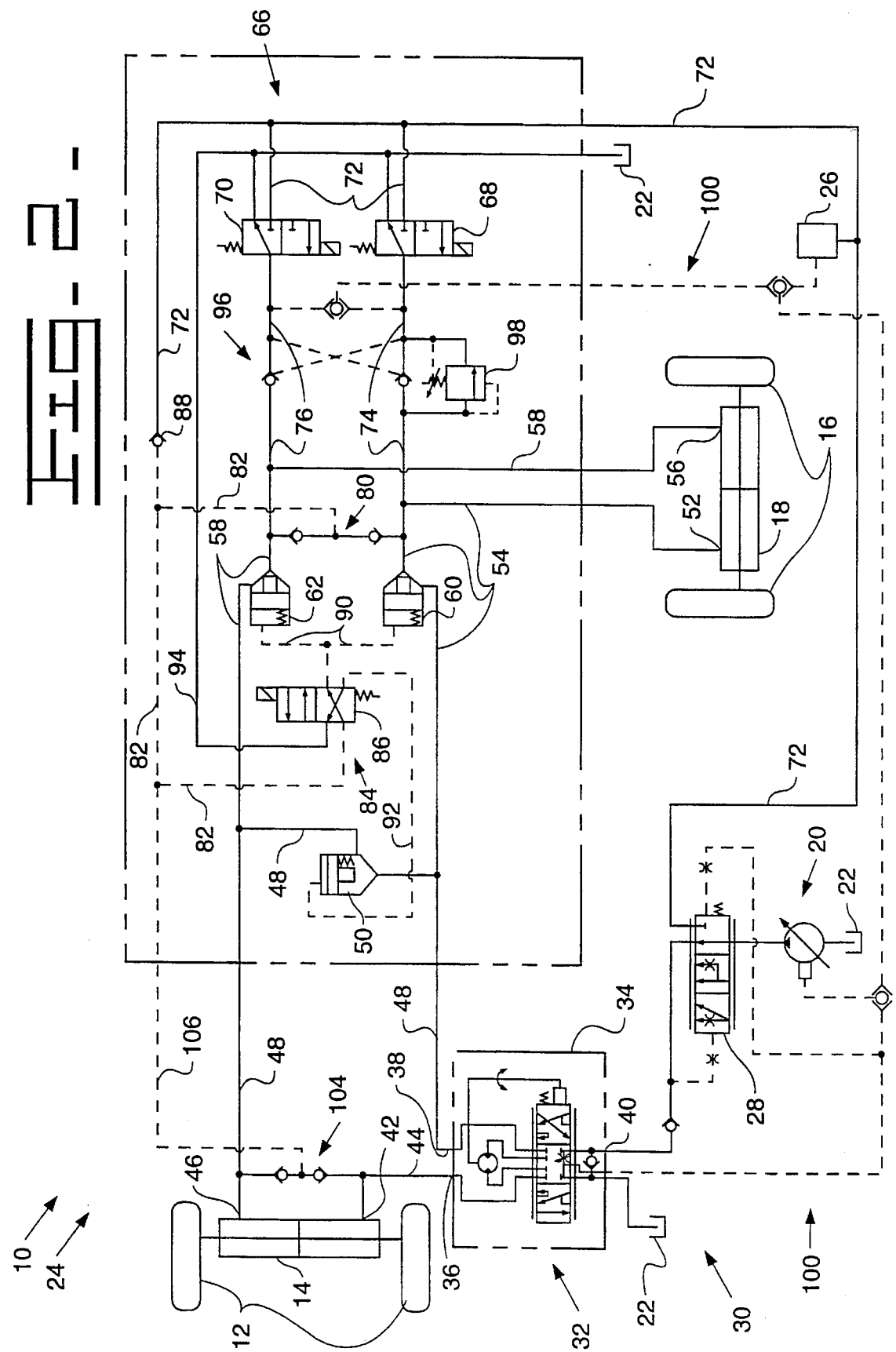
FIG. 2 is a schematic representation of a steering control system incorporating another embodiment of the present invention.

Referring to FIG. 2, another hydraulic system 10 is illustrated and includes another embodiment of the steering control system 24. The embodiment illustrated in FIG. 2 is quite similar to the embodiment of FIG. 1 consequently, all like elements have like element numbers. The embodiment of FIG. 2 includes a second sensing arrangement 104 that is operatively connected between the conduits 44 and 48 generally adjacent the front fluid actuated mechanism 14. The second sensing arrangement 104 operatively senses the highest pressure signal in the front fluid actuated mechanism 14 and delivers the highest pressure signal through a conduit 106 to the pilot conduit 82 and subsequently to the signal control mechanism 84.

It is recognized that various forms of the steering control system 24 illustrated herein could be utilized without departing from the essence of the invention. For example, the electrically actuated valves illustrated herein could be controlled mechanically or hydraulically. Likewise, as previously noted, each of the front and rear fluid actuated mechanisms 14,18 could be two separate cylinders instead of the single one illustrated. The area relationships on the pilot operated poppet valves could be varied to meet the specific requirements of a given system, even though the ones shown are generally illustrated as having a two to one area relationship.

Industrial Applicability

In the operation of the steering control system 24 illustrated in FIG. 1, the operator makes an input to the steer control mechanism 30. In order to have front wheel steer only, the operator makes an input to the HMU 34 thus directing pressurized fluid from the first outlet port 36 to the one end 42 of the front fluid actuated mechanism 14. The exhaust fluid passes therefrom on the other end 46 thereof through the conduit 48 and the normally open pilot poppet valve 50 to the second outlet port 38 of the HMU 34 and subsequently to the reservoir 22. Likewise, an operator's input to the HMU 34 in the opposite direction results in the pressurized fluid being directed though the conduit 48 to the other end 46 of the front fluid actuated mechanism 14 moving it in the opposite direction to steer the front pair of wheels 12 in the opposite direction. During this mode of operation, pressurized fluid from the source 20 is simultaneously being delivered through conduit 72, the one-way check 88, the pilot conduit 82 and the signal control mechanism 84 forcibly holding the first and second normally closed pilot operated poppet valves 60,62 to their closed position thus blocking any fluid flow therethrough.

In order to provide coordinated or circle steering in which the front pair of wheels 12 are steered in one direction and the rear pair of wheels 16 are steered in the opposite direction, the operator makes an input to shift the two-position four-way valve 86 to its second position. The pressurized fluid is vented from the first and second normally closed pilot poppet valves 60,62 through the pilot conduit 90 to the reservoir 22 and simultaneously directs the pressurized fluid from the source 20 through the pilot conduit 92 to forcibly urge the normally open pilot operated poppet valve 50 to its closed position to block the fluid flow therethrough. A subsequent input to the HMU 34 directs pressurized fluid from the first outlet conduit 36 to the one end 42 of the front fluid actuated mechanism 14 to steer the front pair of wheels 12 in one direction. The exhaust flow therefrom passes through the other end 46 thereof, the conduit 48, the conduit 58 and across the second normally closed pilot operated popper valve 62 and into the other end of the rear fluid actuated mechanism 18. This forces the rear fluid actuated mechanism to steer the rear pair of wheels 16 in the direction opposite to the front pair of wheels 12. The exhaust flow therefrom passes through the one end 52 of the rear fluid actuated mechanism 18, the conduit 54 across the first normally closed pilot operated poppet valve 60 and through the conduit 48 to the second outlet port 38 of the HMU 34 and to the reservoir 22.

When it is desired to provide coordinated or circle steer in the opposite direction, the operator provides an opposite input to the HMU 34. The fluid flows from the outlet port 38 of the HMU through the conduit 48, the conduit 54 across the normally closed pilot operated poppet valve 60 to the one end 52 of the rear fluid actuated mechanism 18 to steer the rear pair of wheels 16 in the opposite direction. The exhaust flow therefrom passes through the conduit 58 across the normally closed pilot operated poppet valve 62, the conduit 48 to the other end 46 of the front fluid actuated mechanism 14 to steer the front pair of wheels 12 in a direction opposite to the rear pair of wheels. The exhaust flow therefrom passes through the conduit 44, across the HMU to the reservoir 22.

The flow through the normally closed pilot operated poppet valves 60,62 occurs in a well known manner. When the fluid flow is in the direction from the rear fluid actuated mechanism 18 towards the front fluid actuated mechanism 14 and there is no pressurized fluid in the pilot conduit 90, the force of the fluid acting on the end of the poppet against the bias of the spring opens the poppet. When the flow of fluid is in the opposite direction and there is no pressurized fluid in the pilot conduit 90, the force of the fluid acting on a differential area of the poppet against the bias of the spring opens the poppet.

During the coordinated or circle steer in either direction, the normally open pilot operated poppet valve 50 is held closed by the pressurized fluid from the source of pressurized fluid 20 being directed thereto through the pilot conduit 92. Furthermore, in the event either or both of the rear pair of wheels 16 are subjected to a ground induced load trying to move it from its preset direction, the ground induced load is sensed through the sensing arrangement 80 and the highest pressure signal is delivered through the pilot conduit 82 to the signal control mechanism 84 and directed to the normally open pilot operated poppet valve 50 to more forcibly hold it in its closed position.

In the event of an electrical failure during operation in the coordinated steer or rear steer modes, the system automatically resorts to the front wheel steer mode. Since the two position four-way valve 86 is electrically actuated to the second position against the bias of a spring, loss of electrical energy results in the two position four-way valve 86 returning to its first position. As described above, with the two position four-way valve 86 in its first position, the source of pressurized fluid 20 is directed to the two normally closed pilot operated poppet valves 60,62 holding them closed. At the same time, the pressurized fluid holding the normally open pilot operated poppet valve 50 closed is vented to the reservoir 22. Likewise, when operating in the rear steer mode, an electrical failure results in the steering system defaulting to the front steer mode. This is based on the fact that the two position three-way valves 68,70 are electrically actuated to their second positions against the bias of a spring. Consequently, in the event of an electrical failure, the respective two position three-way valves 68,70 are biased back to their first positions which interrupts independent steering of the rear pair of wheels 16.

When it is desired to operate the rear pair of wheels 16 independently of the front pair of wheels 12, the two-position four-way valve 86 is returned to its first position directing the source of pressurized fluid 20 to the first and second normally closed pilot operated poppet valve 60,62 forcibly holding each of them in their closed position. At the same time, the pressurized fluid to the normally opened pilot operated poppet valve 50 is vented to the reservoir 22 allowing the normally opened pilot operated poppet valve to move to its open position. In this mode of operation, the operator moves the first two-position three-way valve 68 to its second position directing pressurized fluid through the conduit 74 and the one side of the lock valve 96 to the one end 52 of the rear fluid actuated mechanism 18 to steer the rear pair of wheels 16. The exhaust fluid therefrom passes through the other end 56 thereof through the conduit 58 to the conduit 76. Since, in a conventional manner, the pressurized fluid in the conduit 74 is directed to the opposite side of the lock valve 96 to open the check in the conduit 76, the exhaust flow therein passes therethrough and subsequently passes to the reservoir 22 through the second two-position three-way valve 70.

Likewise, when it is desired to steer the rear pair of wheels 16 in the opposite direction, the first two-position three-way valve 68 remains unactuated and the second two-position three-way valve 70 is selectively actuated by the operator to direct pressurized fluid through the one side of the lock valve 96 and the conduit 76 to the other end 56 of the rear fluid actuated mechanism 16 causing the rear fluid actuated mechanism 18 to steer the wheels 16 in the opposite direction. The exhaust flow therefrom passes through the conduit 54, the conduit 74 and through the one side of the lock valve 96 to the reservoir 22 across the first two-position three-way valve 68.

When operating the rear pair of wheels 16 independent of the front pair of wheels 12, the pressurized fluid on the opposite ends of the rear fluid actuated mechanism 18 cannot pass through the first and second normally closed pilot operated poppet valves 60,62 since the pressurized fluid from the source 20 is being directed to the first and second normally closed pilot operated poppet valve 60,62 forcibly holding them in their closed position. Since the source of pressurized fluid 20 is acting on a larger area of the first and second normally closed pilot operated poppet valve 60,62 then the area being acted upon by the pressure in the conduits 54,58, the first and second normally closed pilot operated poppet valves 60,62 remain closed. As is well known, when poppet valves are closed there is no leakage thereby.

In the event either of the wheels of the rear pair of wheels 16 is subjected to a ground induced force that could be substantially higher than the source of pressurized fluid 20, the higher pressure signal is sensed by the first sensing arrangement 80 and delivered through the pilot conduit 82 to the first and second normally closed pilot operated poppet valve 60,62 to forcibly hold them in their closed position.

The thermal expansion valve 98 is effective to allow fluid in the conduit 54 to be bypassed around the one side of the lock valve 96 in the event the pressure therein increases to an extreme high level due to thermal expansion of the fluid therein. Any fluid that is bypassed around the lock valve 96 can be readily made up by fluid from the HMU 34 or the rear steer valve mechanism 66 during the next steer input. However, since the fluid in the conduit 58 is a fixed volume of fluid that is always needed to actuate one or other of the other ends 46,56 of the front and rear fluid actuated mechanisms 14,16, depending on their direction of steering, it is desirable not to allow any of the volume of fluid therein to be bypassed around the lock valve 96 since it could result in cavitation of the associated conduits. Since the pressure is the same on both ends of the front and rear fluid actuated mechanisms 14,18, it is only necessary to provide thermal expansion relief on one end thereof. Any thermal expansion in the conduit 58 would be relieved once the pressure in the conduit 54 is relieved through the thermal expansion valve 98.

Referring to FIG. 2, the operation relating to the various modes of steering is the same as that set forth with respect to FIG. 1. In the embodiment illustrated in FIG. 2, the second sensing arrangement 104 senses the highest pressure in the front fluid actuated mechanism 14 and delivers the highest signal therefrom through the conduit 106 to the signal control mechanism 84 and subsequently to the first and second normally closed pilot operated poppet valves 60,62 or the normally opened pilot operated poppet valve 50 depending on the position of the two-position four-way valve 86. The second sensing arrangement 104 is effective to transmit any forces generated in the front fluid actuated mechanism 14 by ground induced forces on the front pair of wheels 12 to the respective pilot operated popper valves 50,60,62 in order to more effectively hold them in their closed position.

In view of the foregoing, it is readily apparent that the steer control system 24 of the present invention provides a simple arrangement that allows various modes of steering in a machine by using various pilot operated poppet valves to control the fluid flow therein thus eliminating leakage thereacross to maintain synchronization between the front and rear steerable wheels. Furthermore, by sensing ground induced forces and transmitting a signal representative thereof to the various pilot operated poppet valves 50,60,62, the respective pilot operated poppet valves are more effectively maintained in their closed positions during the various modes of steering.

Other aspect, objects and advantages of the invention can be obtained from a study of the drawings, the disclosure and the appended claims.

We claim:

1. A steering control system adapted for use on an all wheel steer machine having front and rear pairs of steerable wheels with each pair of wheels being interconnected to the machine by a fluid actuated mechanism, a source of pressurized fluid and a reservoir, the steering control system comprising:

a steer control mechanism operative to select a plurality of steering modes including a first mode in which only the front wheels are steerable, a second mode in which the front and rear wheels are steered simultaneously with the rear wheels being steered in a direction opposite to the steering direction of the front wheels, and a third mode in which the rear wheels are steered independently of the front wheels, the steer control mechanism includes a steering valve having first and second outlet ports and being disposed between the source of pressurized fluid and the front and rear fluid actuated mechanisms, the first outlet port is connected directly to one end of the front fluid actuated mechanism, a normally open pilot operated poppet valve disposed between the second outlet port and another end of the front fluid actuated mechanism, a first normally closed pilot operated poppet valve disposed between one end of the rear fluid actuated mechanism and the second outlet port of the steering valve and a second normally closed pilot operated poppet valve disposed between another end of the rear fluid actuated mechanism and the front fluid actuated mechanism, a rear steer valve mechanism disposed between the source of pressurized fluid and the rear fluid actuated mechanism to selectively steer the rear pair of wheels, a sensing arrangement connected to both ends of the rear fluid actuated mechanism and operative to continuously sense and deliver the highest pressure signal therefrom, and a signal control mechanism that selectively directs the highest pressure signal from the sensing arrangement or the source of pressurized fluid to the normally open pilot operated poppet valve or to the pair of normally closed pilot operated poppet valves to selectively control the flow of fluid between the front and rear fluid actuated mechanisms.

2. The steering control system of claim 1 including a second sensing arrangement connected to both ends of the front fluid actuated mechanism and operative to continuously sense and deliver the highest pressure signal therefrom through the signal control mechanism to the normally open pilot operated poppet valve or to the pair of normally closed pilot operated poppet valves.

3. The steering control system of claim 2, wherein the rear steer valve mechanism includes first and second two-position three-way valves, the first two-position three-way valve being disposed between the source of pressurized fluid and the other end of the rear fluid actuated mechanism, each of the first and second two-position, three-way valves being operative to direct pressurized fluid to the respective ends of the rear fluid actuated mechanism and to vent pressurized fluid therefrom to the reservoir.

4. The steering control system of claim 3, wherein the signal control mechanism includes a two-position four-way valve that in the first position directs the highest pressure signal from the first and second sensing arrangements to the pair of normally closed pilot operated poppet valves to forcibly urge each of them closed and to vent the signal from the normally open pilot operated poppet valve to the reservoir and in the second position directs the highest pressure signal from the first and second sensing arrangements to the normally open pilot operated poppet valve to force it closed and to vent the signal from the pair of normally closed pilot operated poppet valves to the reservoir.

5. The steering control system of claim 4, wherein the source of pressurized fluid is communicated through a one-way check valve to the two-position four-way valve in parallel with the highest pressure signal from the first and second sensing arrangements.

6. The steering control system of claim 5, wherein each of the first and second two position three-way valves and the two position four-way valve is spring biased to the first position and electrically actuated to the second position and in the event of an electrical failure each of the valves are spring biased to their first positions to automatically interrupt the rear steer mode.

7. The steering control system of claim 1 including a lock valve disposed between both ends of the rear fluid actuated mechanism and the rear steer valve mechanism.

8. The steering control system of claim 7 including a thermal expansion valve disposed between the one end of the rear fluid actuated mechanism and the rear steer valve mechanism in parallel with the lock valve disposed therein and is operative to bypass fluid around the lock valve when the pressure of the fluid in the rear fluid actuated mechanism exceeds a predetermined level.

9. The steering control system of claim 8, wherein the steering valve is a hand metering unit operational to provide pressurized fluid for steering in the event the source of pressurized fluid is lost.

10. The steering control system of claim 1 including a second sensing arrangement connected to both ends of the front fluid actuated mechanism and operative to continuously sense and deliver the highest pressure signal therefrom through the signal control mechanism to the normally open pilot operated poppet valve or to the pair of normally closed pilot operated poppet valves.

* * * * *